United States Patent
Nguyen et al.

(10) Patent No.: US 6,894,804 B2
(45) Date of Patent: May 17, 2005

(54) METHOD TO DYNAMICALLY PERFORM DOCUMENT LAYOUT FUNCTIONS

(75) Inventors: Truc D. Nguyen, San Diego, CA (US); Vincent Wu, Irvine, CA (US)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 741 days.

(21) Appl. No.: 09/970,101

(22) Filed: Oct. 3, 2001

(65) Prior Publication Data

US 2004/0205603 A1 Oct. 14, 2004

(51) Int. Cl.$^7$ .......................... G06K 15/02; G06F 3/12; G06F 13/00
(52) U.S. Cl. .......................... 358/1.2; 358/1.9; 358/1.6
(58) Field of Search ........................... 358/1.2, 1.9, 1.6, 358/1.13, 1.14, 307, 3.12, 3.21, 504, 537, 538, 452, 488

(56) References Cited

U.S. PATENT DOCUMENTS

| | | |
|---|---|---|
| 4,710,886 A | 12/1987 | Heath |
| 4,943,936 A | 7/1990 | Hirai et al. |
| 5,008,709 A | 4/1991 | Shinada et al. |
| 5,058,038 A | 10/1991 | Motoyama et al. |
| 5,097,417 A | 3/1992 | Ukon |
| 5,121,468 A | 6/1992 | Daino |
| 5,175,634 A | 12/1992 | Matsuzaki |
| 5,196,943 A | 3/1993 | Hersee et al. |
| 5,204,758 A | 4/1993 | Sakamoto |
| 5,220,431 A | 6/1993 | Yamagguchi |
| 5,265,209 A | 11/1993 | Kageyama et al. |
| 5,267,047 A | 11/1993 | Argenta et al. |
| 5,287,199 A | 2/1994 | Zoccolillo |
| 5,412,483 A | 5/1995 | Ludlow et al. |
| 5,428,459 A | 6/1995 | Asai |
| 5,438,433 A | 8/1995 | Reifman et al. |
| 5,448,346 A | 9/1995 | Tabata |
| 5,493,635 A | 2/1996 | Brindle et al. |
| 5,504,843 A | 4/1996 | Catapano et al. |
| 5,537,518 A | 7/1996 | Hasegawa |
| 5,537,550 A | 7/1996 | Russell et al. |
| 5,537,626 A | 7/1996 | Kraslavsky et al. |
| 5,563,713 A | 10/1996 | Sugiura |
| 5,610,728 A | 3/1997 | Sobue |
| 5,613,160 A | 3/1997 | Kraslavsky et al. |
| 5,621,539 A | 4/1997 | Brown et al. |
| 5,625,466 A | 4/1997 | Nakajima |
| 5,638,495 A | 6/1997 | Arai |
| 5,642,205 A | 6/1997 | Kassmann |
| 5,671,463 A | 9/1997 | Morikawa et al. |
| 5,694,618 A | 12/1997 | Hibino |
| 5,712,712 A | 1/1998 | Sayward |
| 5,719,685 A | 2/1998 | Kimura et al. |
| 5,732,196 A | 3/1998 | Watanabe |
| 5,732,403 A | 3/1998 | Nakamura |
| 5,734,760 A | 3/1998 | Yoshida |
| 5,784,177 A | 7/1998 | Sanchez et al. |
| 5,835,920 A | 11/1998 | Horton |
| 5,860,073 A | 1/1999 | Ferrel et al. |
| 5,911,037 A | 6/1999 | Yoshida |
| 5,923,826 A | 7/1999 | Grzenda et al. |

(Continued)

Primary Examiner—Douglas Tran
(74) Attorney, Agent, or Firm—Trucker Ellis & West LLP (57) ABSTRACT

A method and system are provided for formatting documents for printing in a selected format and resolution upon determination that the software program generating the print job is incapable of creating a document in the selected layout and at the selected resolution. The process of formatting the document involves causing the software program to generate a print job at a resolution lower than that selected by the user. Images of pages generated by the software program are then formed and printed at a higher resolution, such that the images formed on the printed pages are resized to fit multiple images on one printed page.

13 Claims, 6 Drawing Sheets

U.S. PATENT DOCUMENTS

| | | |
|---|---|---|
| 5,930,005 A | 7/1999 | Yoshida |
| 5,956,737 A | 9/1999 | King et al. |
| 5,961,226 A | 10/1999 | Nishida |
| 5,973,791 A | 10/1999 | Yamamuro et al. |
| 5,995,986 A | 11/1999 | Ueda et al. |
| 6,009,241 A * | 12/1999 | Kawamoto ................ 358/1.9 |
| 6,023,714 A | 2/2000 | Hill et al. |
| 6,028,982 A | 2/2000 | Toyoda et al. |
| 6,076,120 A | 6/2000 | Hatayama |
| 6,088,138 A | 7/2000 | Sakai et al. |
| 6,088,702 A | 7/2000 | Plantz et al. |
| 6,108,676 A | 8/2000 | Nakatsuyama |
| 6,141,705 A | 10/2000 | Anand et al. |
| 6,144,974 A | 11/2000 | Garland |
| 6,161,114 A | 12/2000 | King et al. |
| 6,163,784 A | 12/2000 | Taguchi |
| 6,172,763 B1 | 1/2001 | Toyoda et al. |
| 6,208,427 B1 | 3/2001 | Lee |
| 6,243,721 B1 | 6/2001 | Duane et al. |
| 6,247,028 B1 | 6/2001 | Torisaki |
| 6,247,135 B1 | 6/2001 | Feague |
| 6,269,380 B1 | 7/2001 | Terry et al. |
| 6,327,387 B1 | 12/2001 | Naoi et al. |
| 6,327,599 B1 | 12/2001 | Warmus et al. |
| 6,330,071 B1 | 12/2001 | Vidyanand |
| 6,338,076 B1 | 1/2002 | Hidding et al. |
| 6,343,197 B1 | 1/2002 | Serizawa et al. |
| 6,680,782 B1 * | 1/2004 | Jamzadeh ................ 358/1.14 |
| 2001/0040684 A1 | 11/2001 | Takahashi |

* cited by examiner

METHOD TO DYNAMICALLY PERFORM DOCUMENT LAYOUT FUNCTIONS

BACKGROUND OF THE INVENTION

This invention pertains generally to document formatting, and more specifically to a method of formatting a document printed from a software program in a selected format and at a selected resolution.

Networks today utilize a variety of different operating systems, both on the server side and on the client side. A few common examples of such operating systems are the Windows family of operating systems, Novell, Unix, Linux, as well as various mainframe systems. The many operating systems have different capabilities and interface differently with printer drivers. Consequently, certain user functionality that is available on one system may not be available on other systems.

Generally, a user is able to submit document to a printer for printing in a variety of different formats. Most software applications permit a user to format a document so that it prints in booklet format (2-up) or as any multiple n of pages on a single printed page (n-up) where n is an integer greater than 1. In some circumstances, however, operating systems, software programs and printer drivers are unable to interact properly in order to create an n-up printing format. In such cases, printer drivers generally format the print job and send it to a print controller. As such, when a print job is sent from a print driver to a print controller, it is formatted so that the print controller need not perform any further processing in order to produce a correctly formatted printed document.

Generally, in order to send preformatted pages to a print controller, a print driver must perform all required formatting whenever a particular software program is unable to format the pages as desired. For example, if the desired format is booklet form, the print driver must shrink the output of the software package so that each page received from the software program fits on one half of a booklet format page. The shrinking of the pages alters the image of a particular page and results in data loss. However, some printers have a native ability to generate formatted documents after receiving unformatted data. Using the same booklet example, a print job would be formatted into booklet form after being sent to the printer and prior to printing.

It is preferable to allow a printer, rather than a print driver, to perform formatting because it decreases both network traffic and potential compatibility issues. Because each driver is designed to interface with a particular operating system, drivers tend to be operating system specific. In order to build cross-platform formatting capability into printer drivers to operate a single printer, formatting capability must be built into each operating system specific printer driver. However, while each driver is specific to the particular operating system with which it interfaces, each printer will work with a variety of printer drivers, allowing for cross-platform functionality.

It would therefore be preferable if a print driver were capable of first determining printer capability, and then using that information to determine where document formatting will occur.

SUMMARY OF THE INVENTION

According to the present invention, there is provided a method of formatting a document to be printed from a software program in a selected format and at a selected resolution. The first step of the method involves determining if the software program from which the user is printing is capable of creating the document in the selected format and at the selected resolution. If the software program is not capable of creating the document in the selected format and at the selected resolution, an appropriate output resolution for at least a portion of the document is determined based upon the selected format and the selected resolution. The resolution of at least a portion of the document is altered by the software program prior to the generation of the document for printing by the software program. The resulting generated document, which is in a format and resolution different than that desired, is then assembled such that when the altered resolution document is printed at the selected resolution, the format of the printed document matches the selected format. The document is then printed at the selected resolution.

DETAILED DESCRIPTION OF THE INVENTION

The present invention involves a method and system for formatting documents in n-up format when a software program is incapable of creating an n-up format document. The invention applies to any system comprising a computer running on any operating system that uses at least one printer driver and is connected to at least one printer. In a preferred embodiment, the computer and printer are both connected to a network. The network suitably runs on any network operating system ("NOS") or mainframe system and suitably supports a myriad of software packages. Preferably the present invention is employed in a system where a user of personal computer ("PC") that issues a "print" command to create a hard copy of a document. The hard copy is printed from a printer, which is suitably a multifunction peripheral ("MFP") device such as a combined copier/printer/fax device. Preferably, the system has a raster image processor ("RIP"). In one preferred embodiment, the user selects a "print" command from a menu of command options, such as those used with a graphical user interface operating system. However, it should be understood that the present invention is not limited in this manner and could easily be adapted to systems employing a print or other type function, all without departing from the present invention.

Figure 1:
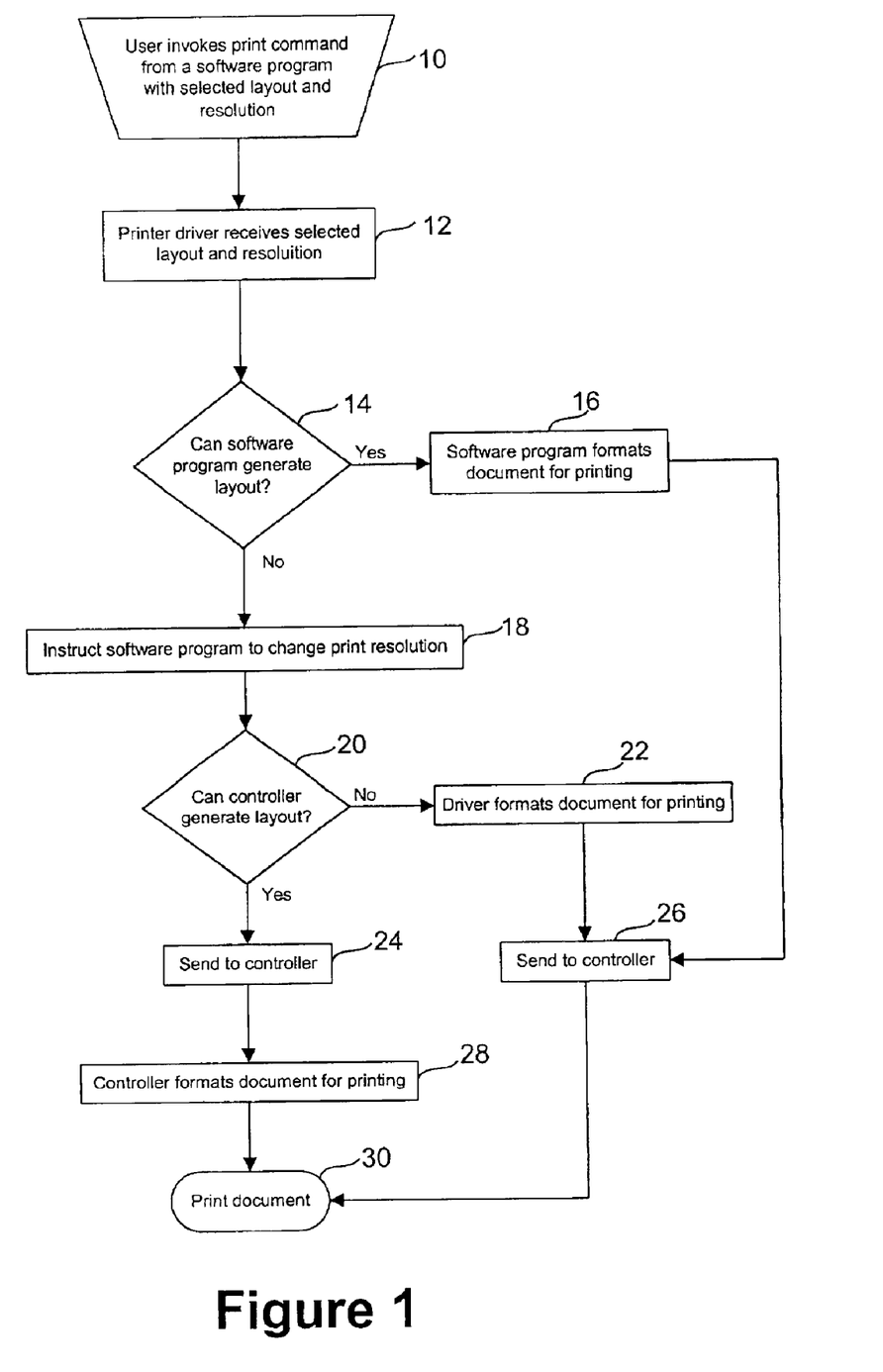
FIG. 1 is a flow chart representing the general process of formatting a document for printing according to the present invention.

Turning to FIG. 1, a flow diagram of a method for formatting a document for printing in a selected format and at a selected resolution is disclosed. The basic flow commences at manual operation 10 when a user invokes a print command from a software program. The software program is not limited to any particular application software program.

The software program is suitably any program in an office suite, a word processing package, or even the operating system itself, e.g. printing from a DOS environment. When a user invokes a print command, the user is prompted to select a print layout and print resolution. In a preferred embodiment, a printer driver on the computer activates a printer dialog box that pops up to enable the user to select various print options including layout and resolution. Upon selecting the desired print layout and print resolution 10, the user-selected options are sent to a printer driver, which receives the selected layout and resolution 12.

A determination is then made at decision block 14 if the software program is capable of creating a printable document in the desired format and at the desired resolution. The determination is suitably accomplished by an examination of the program output. Preferably, the determination is made by a printer driver. A positive determination at decision block 14 causes progression to block 16. At block 16, the software program formats the document for printing and flow progresses to block 26 where the document is sent in formatted form to the controller for printing.

A negative determination at decision block 14 causes progression to block 18. At this point, the software program is instructed to change the print resolution. Preferably, this instruction to change the resolution of the output of the software program is accomplished by the printer driver. In a presently preferred embodiment, the printer driver "tricks" the software program into printing at a resolution that is lower different than the resolution selected by the user. When the print or output resolution is changed, it is altered so that when the document is printed at the resolution selected by the user, the document is formatted in a manner consistent with the layout selected by the user.

For example, if a user selects booklet layout (2-up) document, the software program is instructed to generate a document that is one half the resolution of the user-selected resolution. Furthermore, if the user selects a 4-up layout, the software program is instructed to generate a document that is one fourth the resolution of the selected resolution. Therefore, in one embodiment of the present invention, the software program is suitably instructed to generate a document having a resolution equal to the user-selected resolution divided by the number of pages to be displayed per page in the user-selected output. It should be noted that while this general formula applies to n-up formatted documents, the present invention is not limited to n-up documents. The process of instructing a software program to generate a document at a lower resolution is applicable to any format document where a user selects a layout that requires the shrinking of an image in order to accommodate the selected format.

Following the changing of the print resolution of the software program output, a determination is made at decision block 20 whether the printer controller is capable of generating the layout selected by the user from the altered resolution software program output. A positive determination at decision block 20 causes progression to process 24 where the software program output is forwarded to the controller without further formatting. Flow then progresses to block 28 where the controller formats the document for printing, after which the document is printed and the and the system proceeds to stop at termination block 30.

A negative determination at decision block 20 causes progression to process 22 where the driver, rather than the controller, formats the document for printing. Flow then progresses to process 26 where the formatted document is sent to the controller. After the controller receives the formatted document, the document is printed and the system proceeds to stop at termination block 30.

Figure 2:
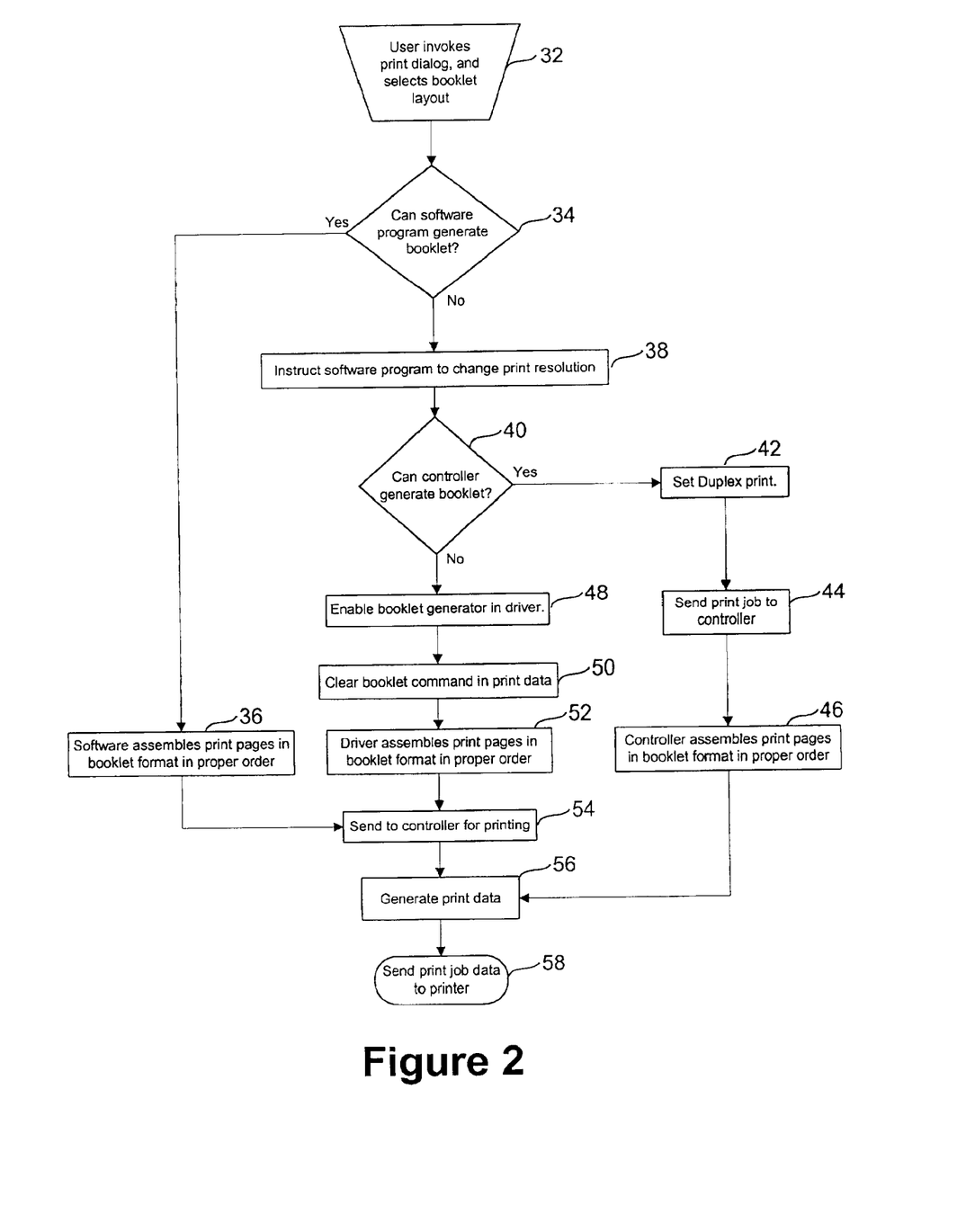
FIG. 2 is a flow chart according to the present invention representing the process of formatting a document for booklet format, and further representing the process involved in the formatting of a document by the driver.

Turning next to FIG. 2, a flow diagram of a method for formatting a document for printing in a booklet format and at a selected resolution is disclosed. Again, the basic flow commences at manual operation 10 when a user invokes a print command from a software program. The software program is not limited to any particular application software program. The software program is suitably any program, such as an office suite, a word processing package, or even the operating system software itself, e.g. printing from a DOS environment. When a user invokes a print command, the user is prompted to select a print layout and print resolution. Upon selecting the desired booklet layout and choosing a desired print resolution, the user-selected options are sent to a printer driver, which receives the selected layout and resolution.

Flow progresses to decision block 34 where a determination is made whether the software program from which a user invoked the print dialog is capable of formatting a document in booklet format. In the presently preferred embodiment, the determination is made by the printer driver through examination of the software program output. A positive determination at decision block 14 causes progression to process 36, where the software program assembles the printed pages in booklet format in proper order. Flow then progresses to processes 54 where the assembled formatted pages are sent to the controller for printing.

A negative determination at decision block 34 causes progression to process 38 where the software program is instructed to generate a standard format output at a resolution different than that selected by the user in manual operation 32. In the presently preferred embodiment, the software program is instructed to print at a resolution that is one half of that selected by the user. For example, if a user selected booklet format layout and a print resolution of 600 dots per inch (dpi), the software program is instructed to create a 300 dpi document in standard, non-booklet printing format.

Flow then progresses to decision block 40 where a determination is made whether the printer controller is capable of creating a booklet format output at the resolution selected by the user in manual operation 32. A positive determination at decision block 40 causes progression to process 42 where the controller is set to duplex mode printing. In the presently preferred embodiment, the printer driver causes the controller to change from simplex mode to duplex mode printing. Flow progresses to process 44 where the print job is then sent to the controller for both formatting and printing. The controller then assembles the print pages in booklet format in proper order during process 46. Following assembly, flow progresses to process 56 where the print data is generated by the controller. In a presently preferred embodiment, the controller receives a document formatted for a resolution that is one half that of the resolution selected by the user and prints the document at the resolution selected by the user. Consequently, the print data sent to the printer will print at one half the size of that generated by the software program, thus allowing for a booklet page layout as two pages will fit on one printed page. The document is then printed by the printer and the system proceeds to stop at termination block 58.

A negative determination at decision block 40 causes progression to process 48 where the booklet generation capabilities of the driver are enabled. The driver then clears the booklet command in the print data generated by the software program during process 50. Flow progresses to process 52 where the driver assembles the print pages in booklet format and in proper order. The print data is then sent to the controller for printing in process 54. At process 54, the print data is pre-assembled by either the software program in process 36 or the printer driver in process 52. Flow then progresses to process 56 where the controller generates the print data at the user-selected resolution. The document is then printed by the printer and the system proceeds to stop at termination block 58.

Figure 3:
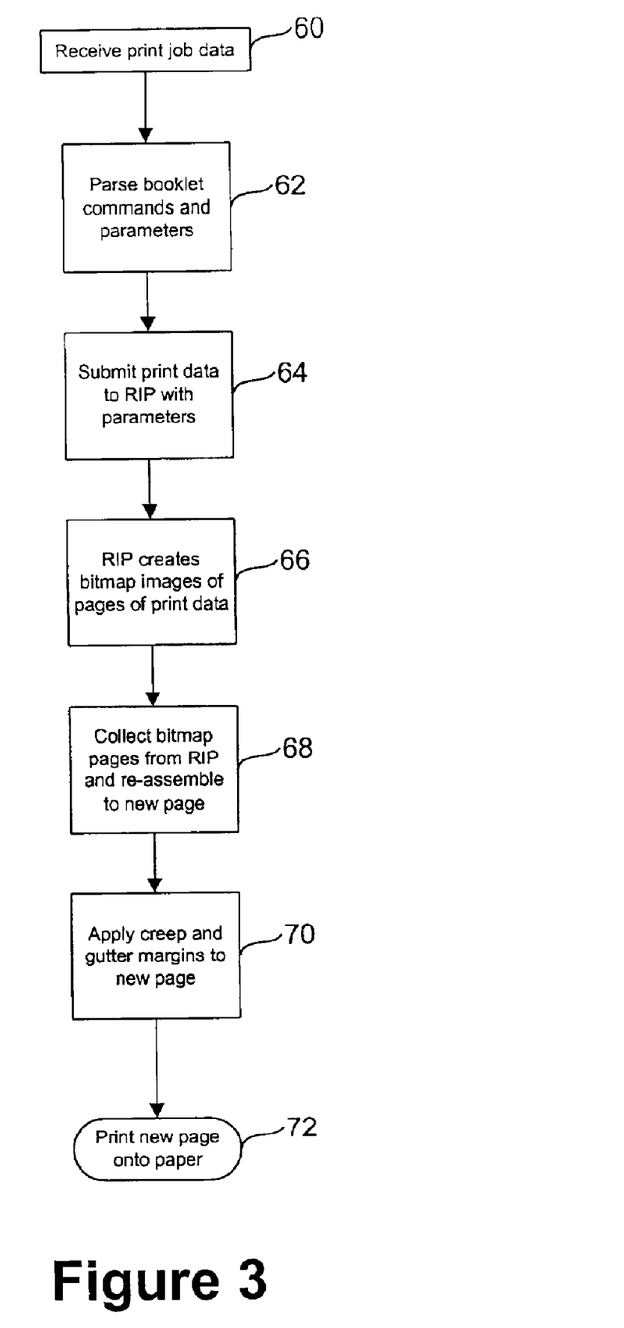
FIG. 3 is a flow chart according to the present invention representing the process of formatting a document for booklet format by a controller.
Figure 4:
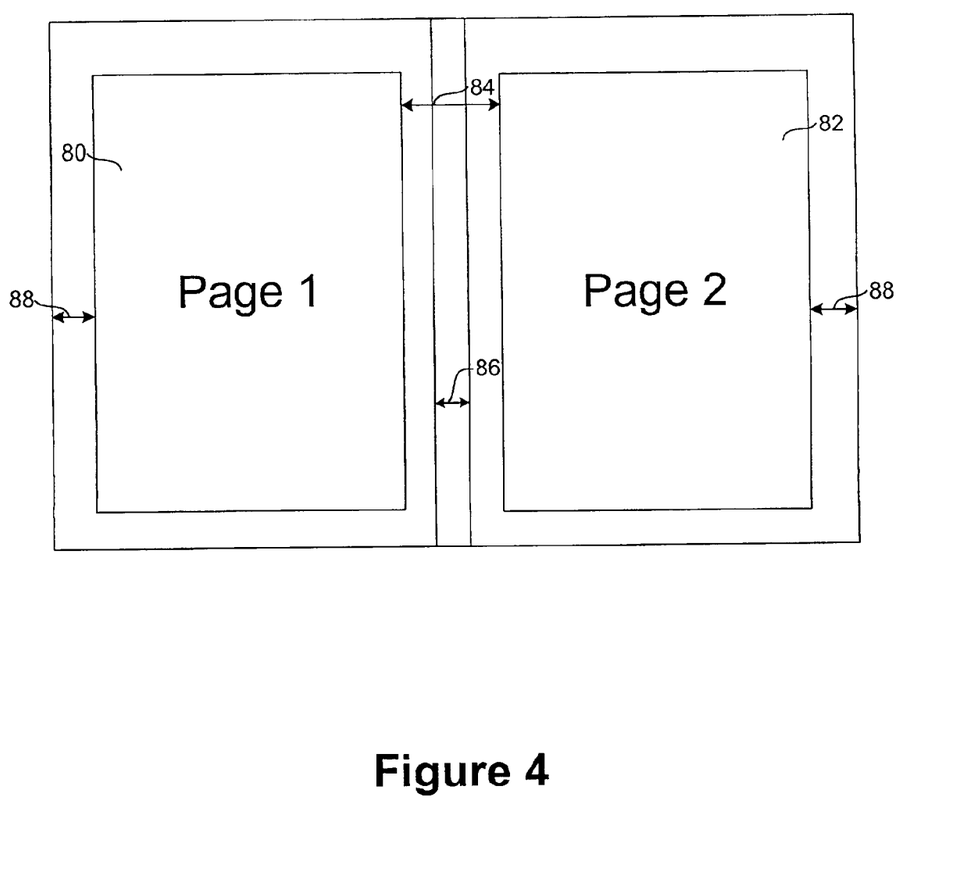
FIG. 4 is a representation of a page in booklet or 2-up format.

Turning now to FIG. 3, a flow diagram is disclosed for generating a booklet format document as shown in FIG. 4. The flow commences upon receipt of print job data 60. The print job data is received from either a software program or a print driver, depending on whether the print driver or controller is generating the booklet format. If the driver generates the booklet format, it will receive a print job from the software program. However, if the printer controller generates the booklet format, it will receive a print job from the driver.

Flow progresses to process 62 where booklet commands and parameters are parsed. The print data including booklet commands and parameters is send to the raster image processor ("RIP") in process 64. Flow progresses to process 66 where the RIP takes the print data and booklet commands and creates a bitmap image of each page to be printed in booklet format. The bitmap images are created at one half the user-selected print resolution. Flow progresses to process 68 where the bitmap images of pages created by the RIP are collected and reassembled for printing. In the reassembly process, the bitmap images for each page are placed on a canvas for printing at the user selected resolution. Because the bitmap images are one half the resolution of the canvas for printing, the images actual printing size is one half of the size of the output by the software program. Therefore, the pages are suitably assembled so that two bitmap images are placed on one new page or canvas for printing.

Once the bitmap images are created for placement on one half of a page for printing, flow progresses to process 70 where gutter space 84, creep 86 and margins 88 are applied to each new page upon which there are placed bitmap images 80 and 82 of pages received by the RIP. The gutter space is defined as the distance between pages 80 and 82. The creep 86 is the change in gutter space 84 required as the number of pages in a document grows. The reason for the increase in gutter space 84 is that paper has a defined thickness, depending on the type of stock used. As growing numbers of pages are folded in half to create a booklet, the outer sheets seem shorter and shorter. Once the pages are evenly cut, margins 84 shift noticeably between the middle and the beginning and ending of the booklet. The creep 86 increases the gutter 84 of the pages 80 and 82 so that text is correctly positioned on each imposed sheet.

Following the application of gutter space 84, creep 86 and margins 88 to the new booklet format page, flow progresses to termination block 72 where the document is printed and the system proceeds to stop.

Figure 5:
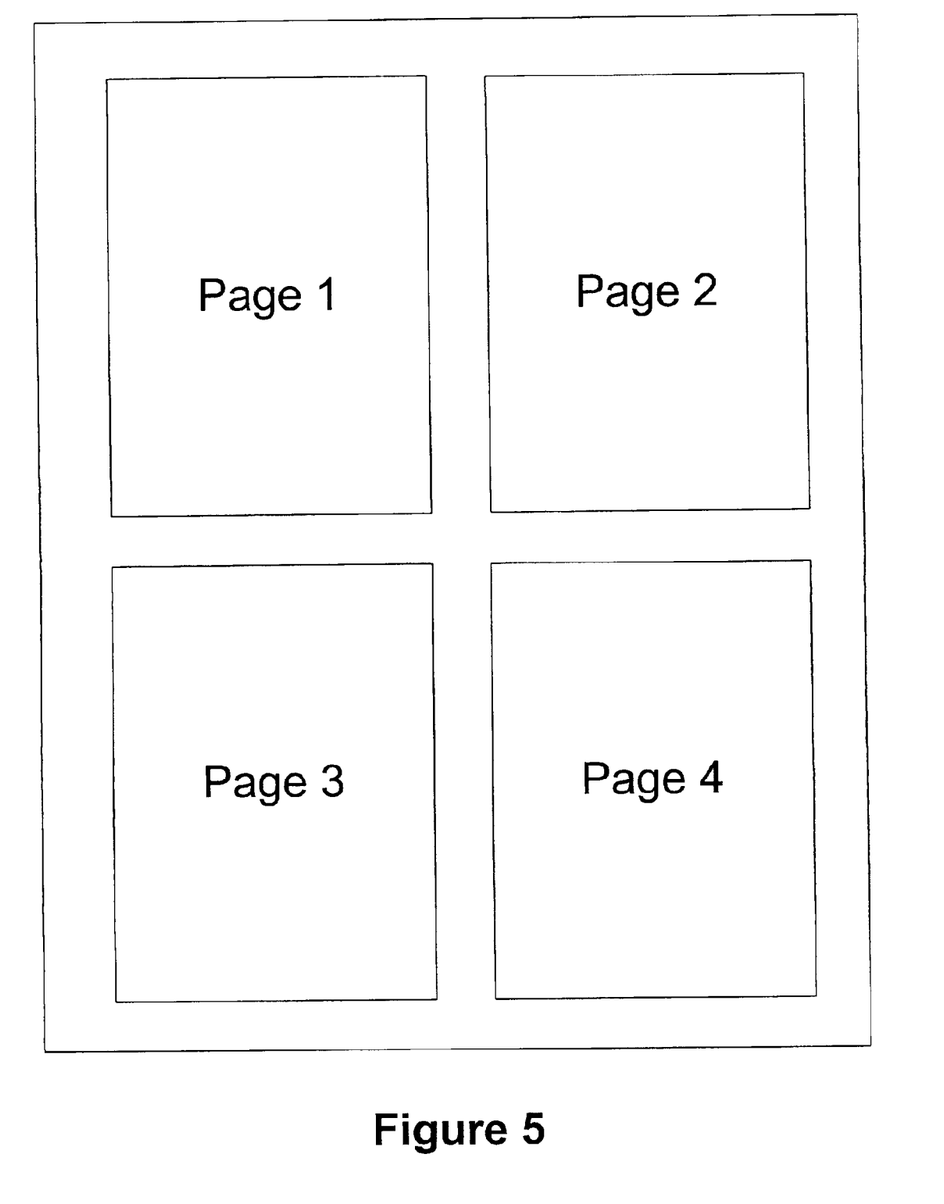
FIG. 5 is a representation of a page in 4-up format.

Turning now to FIG. 5, a 4-up page layout is shown. A document of the type shown in FIG. 5 is suitably created according to the present invention by generating a document from a software program having a resolution of one fourth that of the selected print resolution. When the RIP generates bitmap images of print data, the bitmap images are one fourth the size of a page, rather than one half as they are when a booklet format is selected. The RIP suitably collects the bitmap images and reassembles them onto a new page, where four images are assembled per page. While FIG. 5 depicts an across, then down order of pages, a down, then across order of pages may also be created according the present invention. Furthermore, when creating a 4-up document, the RIP need not adjust creep or gutter space.

Figure 6:
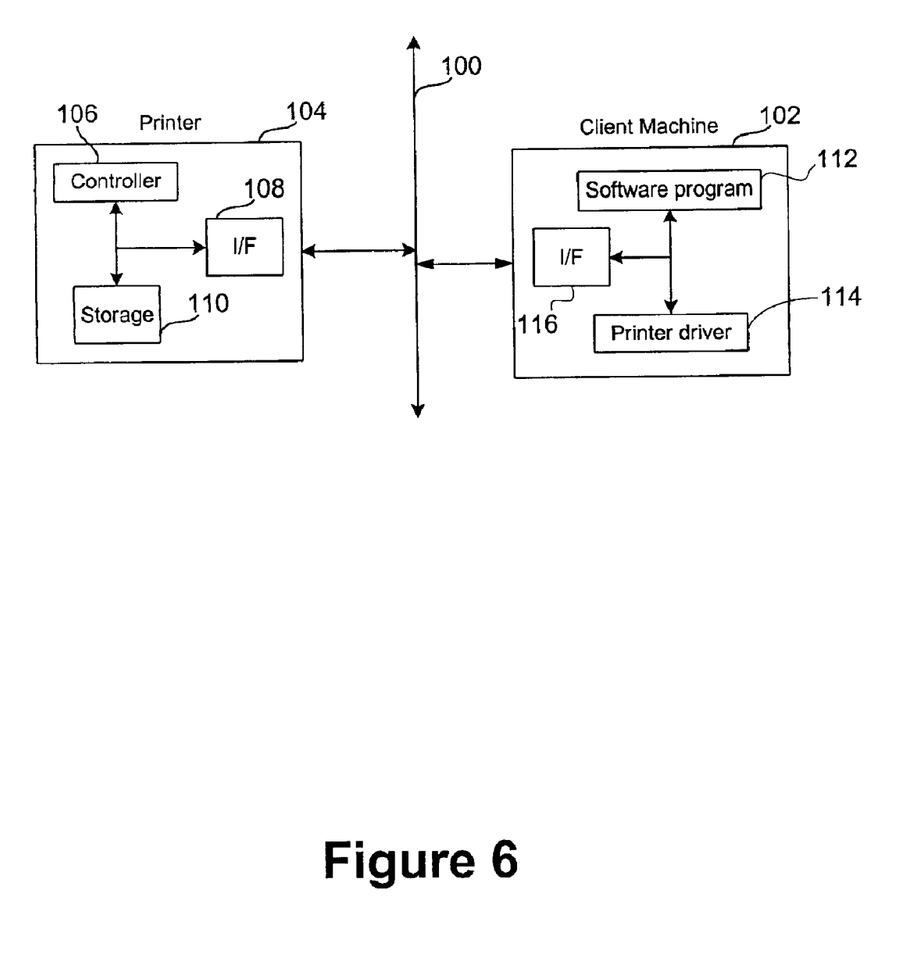
FIG. 6 is a representation of a network.

Turning now to FIG. 6, there is provided a diagram of a network system for practicing the present invention. The network 100 is illustrative of a LAN or WAN environment in which a preferred embodiment is provided. Connected to a network 100 are a client machine 102 and a printer 104. The network 100 is suitably any network and is suitably comprised of physical and transport layers such as illustrated by a myriad of conventional data transport mechanisms such Ethernet, Token-Ring™, 802.11(b), or other wire-based or wireless data communication mechanisms as will be apparent to one of ordinary skill in the art. The client machine is suitably any type of computer, but is preferably a PC running an on a Windows, Unix, Macintosh, or Linux based operating system. The client machine 102 is equipped with a software program 112, a printer driver 114, and a network connector 116. It should be noted that the printer driver 116 is suitably loaded on the client machine or on a network server.

The printer 104 is suitably any networked printer. However, it should be noted that while the preferred embodiment of the present invention is a network system having multiple client machines and at least one printer, the present invention includes systems having printers and personal computers connected directly to one another through a port such as a USB or a LPT port. The printer 104 is equipped with a printer controller 106, a network connector 108 and internal storage 110. The printer internal storage 110 is suitably a hard disk or random access memory ("RAM").

When a user of the client machine 102 invokes a "print" command from a software program 112, the printer driver 114 is activated. The printer driver 114 causes a selection window to be displayed on a computer monitor connected to the client machine 102. The user then selects a layout and a print resolution. If the software program 112 is capable of generating a document in the selected layout and resolution, the printer driver 114 sends the data generated by the software program directly to the printer 104. However, if the software program 112 is not capable of generating the selected layout and resolution, the printer driver 114 instructs the software program 112 to generate a document at a lower resolution which is calculated based on the difference between a standard document and the selected layout. Preferably, in a n-up document, the resolution at which the software program 112 generates a document is defined as the user selected resolution divided by n.

Upon receiving the document generated a lower resolution than the selected resolution, the printer driver 114 makes a determination whether the printer controller 106 is capable of generating the selected layout and resolution from the lower resolution output of the software program 112. Upon a positive determination, the printer driver 114 forwards the output of the software program 112 to the printer controller 106. The printer controller 106 then formats the document and generates the selected layout at the selected resolution. Upon a negative determination, the printer driver 114 generates the selected layout and resolution. After generating the selected layout and resolution, the printer driver 114 sends the formatted document to the printer 104 for printing.

Although the preferred and alternate embodiments have been described in detail, it should be understood that various changes, substitutions and alterations can be made therein without departing from the spirit and scope of the invention as defined by the appended claims.

What is claimed is:

1. A method of formatting a document to be printed from a software program in a selected format and at a selected resolution, comprising the steps of:
    a) receiving formatting data representative of a selected format and a selected resolution for an print image;
    b) determining if the software program is independently capable of creating the document in the selected format and at the selected resolution;
    c) receiving data representative of a selected output resolution for at least a portion of the document based upon the formatting data;
    d) altering the resolution for at least a portion of the document prior to the generation of the document for printing by the software program upon a negative determination in step b);
    e) generating, via the software program, at least a portion the document at the altered resolution and in a format different than the selected format;
    f) receiving the altered resolution output from the software program and assembling the same such that when the altered resolution document is printed at the selected resolution, the format of the printed document matches the selected format; and
    g) generating final print data from step f) adapted for printing the document at the selected resolution.

2. The method of claim 1 wherein the selected format is n-up format, where n is an integer greater than 1.

3. The method of claim 2 wherein the appropriate output resolution is the selected resolution divided by n.

4. The method of claim 2 wherein the selected format is booklet format.

5. The method of claim 1 further comprising generating images of pages of the altered resolution output of the software program.

6. The method of claim 5 further comprising collecting the generated images of pages and reassembling the generated images of pages onto a new page.

7. A system for formatting a document for printing from a software program in a selected format and at a selected resolution comprising:
    a) testing means for determining whether a software program is capable of independently creating a document in a preselected format and preselected resolution;
    b) means for determining the appropriate resolution for at least a portion of the document based upon the selected format and the selected resolution;
    c) means for altering the resolution for at least a portion of the document prior to the generation of the document for printing by the software program;
    d) means for generating at least a portion the document at the altered resolution and in a format different than the selected format;
    e) assembling means for receiving the altered resolution output from the software program and assembling the output such that when the altered resolution document is printed at the selected resolution, the format of the printed document matches the selected format; and
    f) means adapted for communicating final print data received from the assembling means, which final print data is adapted for printing the document at the selected resolution.

8. The system of claim 7 wherein the testing means is comprised of a printer driver.

9. The system of claim 7 wherein the means for determining the appropriate resolution for at least a portion of the document is comprised of a printer driver.

10. The system of claim 7 wherein the means for altering the resolution for at least a portion of the document prior to the generation of the document for printing by the software program is accomplished in accordance an instruction communicated by a printer driver to the software program.

11. The system of claim 7 further comprising a means for determining whether a printer controller is capable of formatting the document for printing at the selected format and at the selected resolution.

12. The system of claim 11 wherein the means for reformatting the output is comprised of the printer controller.

13. The system of claim 11 wherein the means for reformatting the output is comprised of the printer driver.

* * * * *

UNITED STATES PATENT AND TRADEMARK OFFICE
CERTIFICATE OF CORRECTION

PATENT NO. : 6,894,804 B2
DATED : May 17, 2005
INVENTOR(S) : Truc D. Nguyen and Vincent Wu It is certified that error appears in the above-identified patent and that said Letters Patent is hereby corrected as shown below:

<u>Title page,</u>
Item [74], *Attorney, Agent, or Firm*, should read -- TUCKER ELLIS & WEST LLP --

Signed and Sealed this

Twelfth Day of July, 2005

JON W. DUDAS
*Director of the United States Patent and Trademark Office*